United States Patent [19]

Bennett

[11] Patent Number: 4,848,244
[45] Date of Patent: Jul. 18, 1989

[54] FOLD-AWAY HINGE AND SUPPORT

[75] Inventor: William C. Bennett, St. Charles, Ill.

[73] Assignee: Harry J. Cameron, Glendale Heights, Ill.

[21] Appl. No.: 252,155

[22] Filed: Oct. 3, 1988

[51] Int. Cl.⁴ .......................... A47B 3/00; E05D 15/32; E05D 11/06

[52] U.S. Cl. ........................................ 108/38; 16/370; 16/371; 108/134; 108/48

[58] Field of Search ................. 16/370, 371, 288, 363; 108/42, 38, 48, 134; 248/284

[56] References Cited

U.S. PATENT DOCUMENTS 1,658,771  2/1928  Nelson .................................. 108/38

FOREIGN PATENT DOCUMENTS 387927  2/1933  United Kingdom ................. 108/134
413106  7/1934  United Kingdom ................. 108/38
602274  5/1948  United Kingdom ................. 16/371

Primary Examiner—Nicholas P. Godici
Assistant Examiner—Carmine Cuda
Attorney, Agent, or Firm—John L. Schmitt

[57] ABSTRACT

A hinge device particularly adapted for positioning a work surface in a vertical in-storage position or a horizontal in-use position comprises a first and a second arm. Each arm is defined by an elongated segment connecting with an angularly positioned short segment. An end of first arm short segment is pivotally attached to an upper end of a support member. An end of the first arm elongated segment in turn is pivotally attached to an outer part of the work surface. In the first arm elongated segment is a slot positioned inward from the end. An end of the elongated segment of the second arm is pivotally attached to a lower end of the support member. An end of the second arm short segment in turn is pivotally attached to an inner part of the work surface. In the second arm short segment is a recess defined in part by an inner support ledge. To move the work surface from its vertical in-storage position to its horizontal in-use position the work surface first is raised to a point above the horizontal where the second arm-work surface pivot connection is located in the first arm slot. Then, the work surface may be lowered to its horizontal in-use position and there supported by an interference fit between a bottom edge of the first arm elongated segment and the second arm recess inner support ledge.

6 Claims, 2 Drawing Sheets

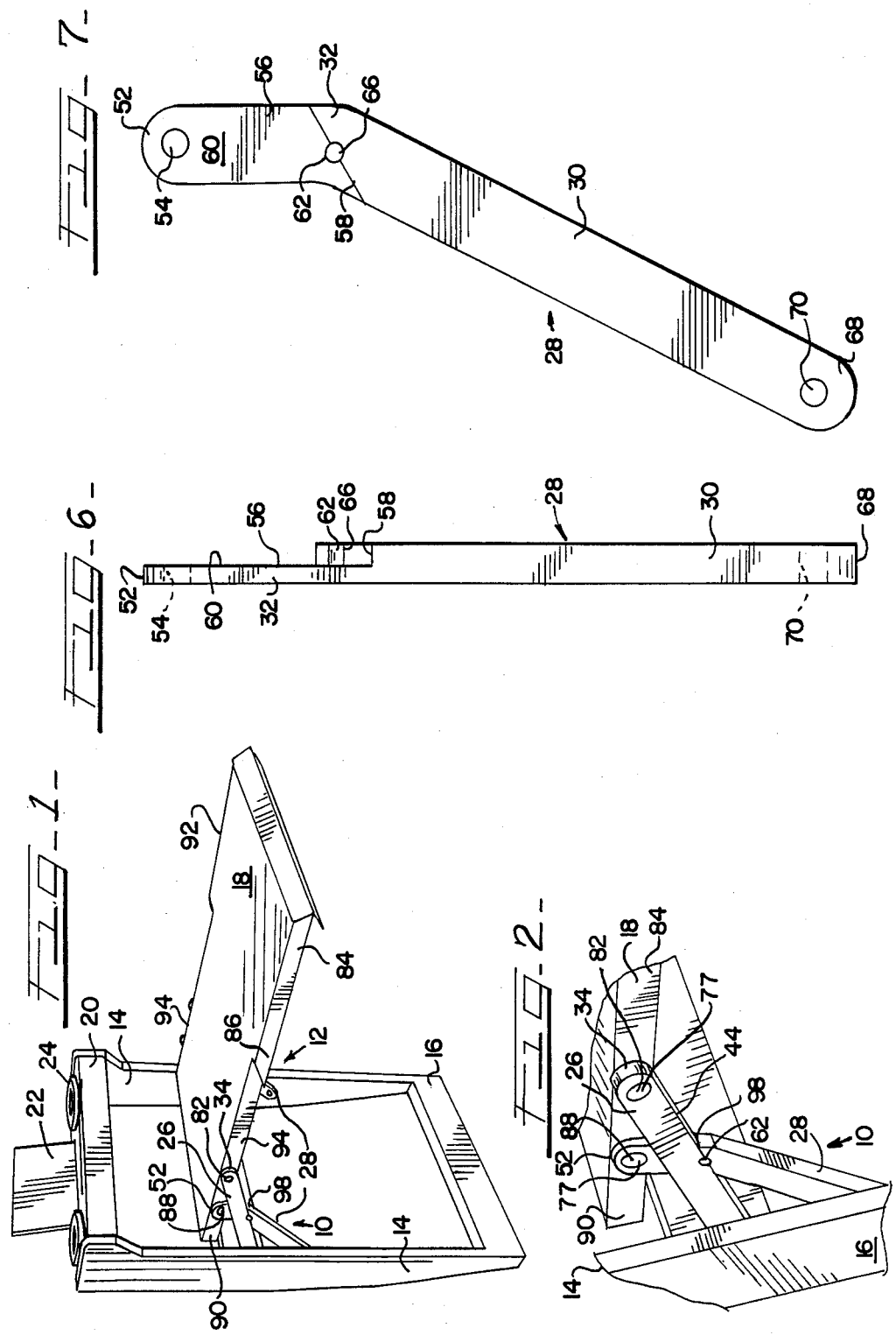

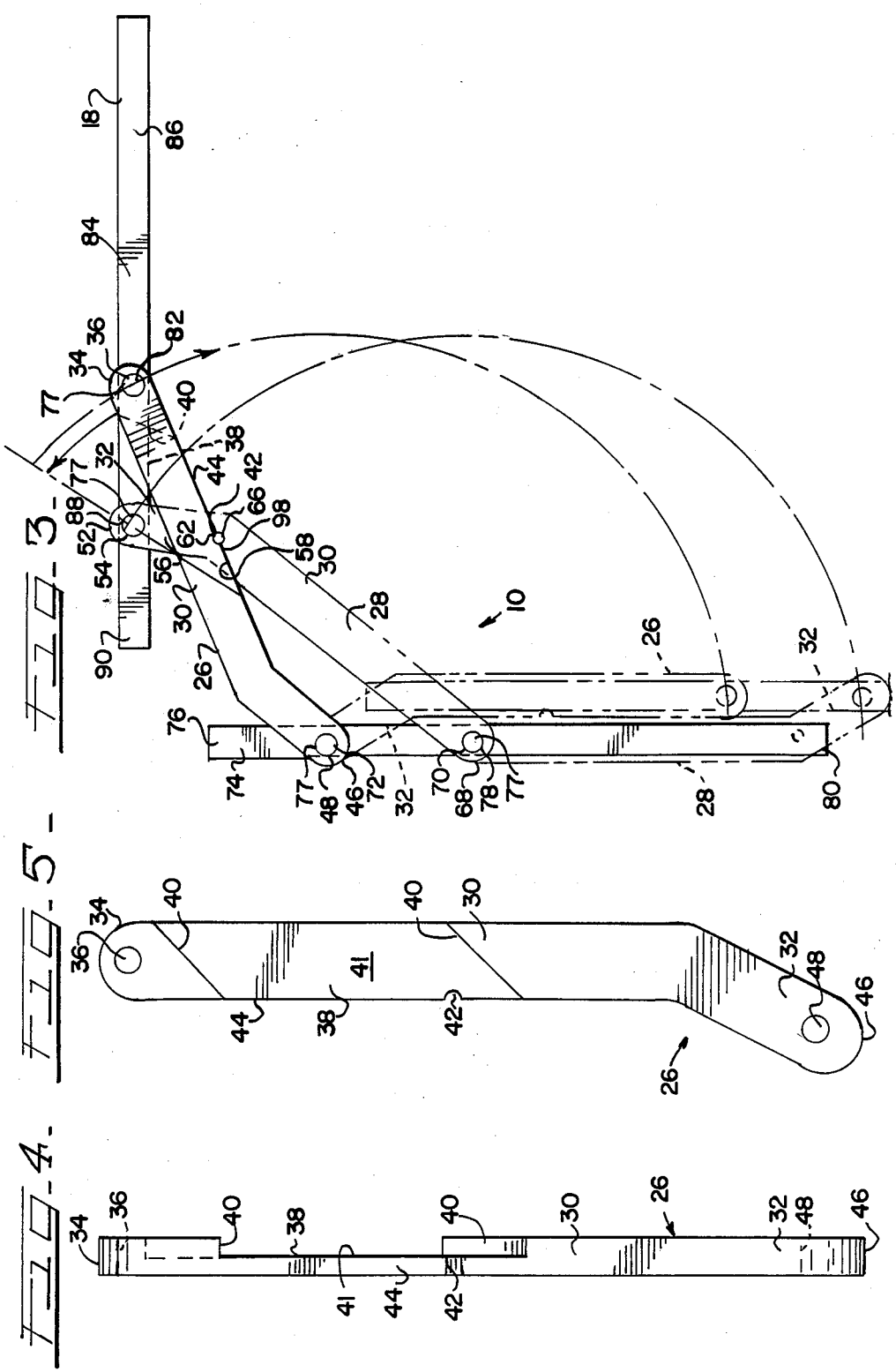

FOLD-AWAY HINGE AND SUPPORT

BACKGROUND OF THE INVENTION

1. Field of the Invention

This invention relates to hinge devices and more particularly to a fold-away type hinge which may support a work surface such as a small work table in a horizontal in-use position and then allow the table to be rotated to a vertical position for storage.

2. Prior Art

Fold-away type hinging devices that allow a work surface to be rotated from a vertical storage area to a horizontal in use position are well known and have been in use for some time.

One early fold-away type hinge is set forth in U.S. Pat. No. 1,580,289. This hinge comprises a lower strut having an inner end pivotally attached to a vertical member. An outer end of the lower strut is formed with a slot and a lug shaped head with a locking point. This hinge further includes an upper strut defined by spaced apart sidewalls connected by a top wall. The top wall terminates short of an inner end of the upper strut. The lug shaped head of the lower strut is positioned between the sidewalls at the upper strut inner end. Then, a pin carried by these sidewalls is disposed in the lower strut slot to form a slideable pivot connection. An outer end of the upper strut is pivotally connected to an outer end of the shelf while an inner end of a shelf is hinged to a top of the vertical support.

When the shelf is in an in-use horizontal position, the shelf is supported by the struts. The struts are held in place by an interference fit between the lower strut lug locking point and the upper strut top wall. To lower the shelf to a vertical out-of-use position, the shelf is first raised allowing the locking point to release from the outer strut top wall. The shelf then may be lowered to a vertical position next to the support.

Another early fold-away type hinge device is disclosed in U.S. Pat. No. 1,658,771. This device includes a vertical support which may be attached to a back wall of a storage compartment. Pivotally connected respectively to a top and a bottom end of the vertical support are inner ends of an upper and a lower arm. Outer ends of these arms in turn are spaced apart and pivotally attached to a side of a wall table. When the table is positioned horizontally for use, the upper arm aligns with a side of the table while the lower arm is positioned on an angle to form a brace. Downward rotation of an outer end of the table is prevented by an interference fit between a stop member in the storage compartment and an upper side of an inner end of the table.

A still further hinge device allowing movement of a casement-type window between a vertical closed position and a horizontal open position in a window frame is disclosed in U.S. Pat. No. 3,497,909. This hinge comprises an upper and lower pivot arm. The upper arm has an inner end pivotally connected to a block slideably disposed in a slot in an upper portion of the frame. An outer end of the upper arm is pivotally connected to an upper portion of the window. Ends of the lower arm are pivotally connected to a lower portion of the frame and a lower end of the window respectively. When the window is opened, the lower arm rotates downward about its frame connection while the bottom end of the window swings up. The upper arm first in turn rotates downward about the block connection with the block then sliding downward in the frame slot so that the window may be positioned horizontally.

SUMMARY OF THE INVENTION

A fold-away type hinge of this invention is particularly adapted for positioning a working surface such as a small table in a stored vertical position or for supporting the table in a horizontal in-use position. This hinge includes a first and second arm. Except as noted, the arms are substantially identical being defined by an elongated segment joined by an angularly positioned short segment.

An end of the short segment of the first arm is pivotally joined to an upper portion of a vertical support member while an end of the second arm elongated segment is pivotally joined to a lower portion of the support member. An opposite or exterior end of the first arm in turn is pivotally connected to an outer part of the work surface. An opposite or exterior end of the second arm is pivotally attached to an inner part of the work surface. Adjacent to the end of the elongated segment of the first arm is a slot. The exterior pivot of the second arm short segment is formed as part of a recess that includes an inner support ledge.

In a typical installation a pair of spaced apart hinges are attached to respective sides of the work surface. This pair comprises a right and a left hand hinge. In each case the first arm is positioned to an outside of the second arm.

When the work surface is not in use, it may be rotated to a vertical position next to the support members to which the arms of each hinge are attached. In this case the elongated segment of the second arm of each hinge aligns with the support member, and the elongated segment of the first arm of each hinge aligns with the work surface.

To place the work surface in a horizontal in-use position the outer part of the work surface is swung upward until this work surface part is above a horizontal plane and the second arm-work surface pivot connections align with the first arm slots of each hinge. At this point the outer part of the work surface may be lowered until the bottom edge of the first arm engages the second arm recess inner support ledge of each hinge arm forming a respective interference fit. These fits prevent further downward movement of the work surface so that the work surface is now positioned horizontally. The work surface may be returned to storage by reversing this procedure.

The fold-away hinge of this invention provides several advantages over other known fold-away type hinges.

A first advantage is the simplicity of the hinge. Note that the hinge at a minimum may comprise only its two arms. The vertical support to which the interior ends of the arms are attached need not be part of the hinge itself.

A second important advantage of this inventive hinge is that the in-storage position of the work surface is vertical. Thus, during storage only a minimum amount of floor space is required. Additionally, the elevation of the support structure for a set of hinges is below the elevation of the work surface in its in-use position. These spacing relationships are particularly important for interior design purposes.

Lastly, this hinge provides substantial support for the work surface. When a load is applied to the work surface, this vertically acting force bends the arms to produce compressive, tensional and torsional type stresses. Each hinge has two pairs of interacting surfaces to resist these resulting stresses. The first pair of interacting surfaces is noted above in describing the interference fit between the arms. The second pair of interacting surfaces is a bottom wall of the first arm slot and a sidewall of the second arm recess. The interaction between these latter surfaces inhibits twisting of the arms. If the arms were to be twisted a sufficient amount, the first arm could dislodge from the second arm inner support ledge. Note that because the typical installation uses a right hand and left hand hinge, twisting in either a clockwise or counterclockwise direction is inhibited. Thus, a pair of hinges may support a substantial load without undue consideration of the material from which the arms are made or the size of the arms.

DESCRIPTION OF THE DRAWINGS

FIG. 1 is perspective view of a work table carried by a pair of fold-away hinges of this invention.

FIG. 2 is a detailed view of a selective portion of the FIG. 1.

FIG. 3 is a side elevation view of the fold-away hinge showing the work table in a horizontal in-use position, in a vertical in-storage position, and paths of arm movement between these positions.

FIG. 4 is an end elevation view of a first arm of the hinge of FIG. 3.

FIG. 5 is a side elevation view of a first arm of FIG. 4.

FIG. 6 is an end elevation view of a second arm of the hinge of FIG. 3.

FIG. 7 is a side elevation view of the second arm of FIG. 6.

DESCRIPTION OF THE PREFERRED EMBODIMENT

Referring to FIG. 1, a pair of fold-away type hinges comprising a right hand hinge and a left hand hinge is shown generally and designated 10 and 12. The hinges 10,12 are attached to respective side members 14 of a support frame 16. The support frame 16 may form an integral part of an interior sidewall of a small private aircraft, for example. A passenger seat (not shown) typically would be positioned next to the frame 16 allowing a passenger in that seat access to a work table 18 carried by the hinges 10,12. A top horizontal section 20 of the support frame 16 may include a waste receptacle 22 and an ash tray 24.

Each hinge 10,12 comprises a first arm 26, FIGS. 4 & 5, and a second arm 28, FIGS. 6 & 7. The hinges 10,12 are the same except for being opposite hand so that in each case the first arm 26 is positioned to an outside of the second arm 28. Because the hinges 10,12 are the same except for being opposite hand, only the hinge 10 is described in detail.

As best understood by viewing FIGS. 5 and 7, the arms 26, 28 have the same general shape, being defined by an elongated segment 30 connecting with an angularly positioned short segment 32. In an end 34 of the elongated segment 30 of the first arm 26 is an aperture 36. Positioned inward from this aperture 36 is an elongated notch or slot 38. This slot 38 is defined in part by spaced apart, angularly positioned end walls 40, a bottom wall 41 and a circular notch 42 formed in a side edge 44 of the slot 38. In an end 46 of the short segment 32 of the first arm 26 is a further aperture 48.

As seen in FIGS. 6 and 7, in an end 52 of the short segment 32 of the second arm 28 is an aperture 54 formed as part of an end recess 56. This end recess 56 is defined in part by an angularly positioned inner support ledge 58 and a sidewall 60. A hardened pin 62, which may be pressed into a bore in the second arm short segment 32, is carried in a groove 66 in the inner support ledge 58. In an end 68 of the elongated segment 30 of the second arm 28 is a further aperture 70.

Now referring to FIG. 3, the end 46 of the short segment 32 of the first arm 26 is attached by a pivot connection 72 to an upper portion 74 of a vertical support member 76. This pivot connection 72 is formed by a pivot pin 77 disposed in the aperture 48. Note that this vertical support member 76 may be a separate component for attachment to or formed as an integral part to the support frame side member 14, for example. The end 68 of the elongated segment 30 of the second arm 28 is attached by a pivot connection 78 to a lower portion 80 of the support member 76. This pivot connection 78 is formed by another pin 77 disposed in the aperture 70. Note that as attached, the arms 26,28 are positioned in opposing manner.

Continuing to refer to FIG. 3, the end 34 of the elongated segment 30 of the first arm 26 is attached by a pivot connection 82 of an outer part 84 of a side 86 of the work table 18. This pivot connection 82 is formed by a further pin 77 positioned in the aperture 36 of the first arm 26. The end 52 of the second arm short segment 32 in turn is attached by a pivot connection 88 to an inner part 90 of the work table side 86. This pivot connection 88 is formed by another pin 77 located in this case in the aperture 54. It should be understood that the hinge 12 is attached in a similar manner to the other support frame side member 14 and to an opposite side edge 92 of the work table 18. As seen in FIG. 1, the work table side edges 86,92 may be formed with respective offsets 94 for the pivot connections 82, 88.

During use the work table 18 is positioned horizontally as seen in FIGS. 1 and 3. As located, the work table 18 is supported by the arms 26,28 of each hinge 10,12. This support is provided by an interference fit 98 between the side edge 44 of the first arm slot 38 and the inner support ledge 58 of the second arm recess 56 of each hinge 10,12. If an unusually heavy load were applied to the work table 18, this applied force would bend the arms 26,28. Any such bending in turn would produce torsional forces that would causes the arms 26, 28 to twist. Sufficient twisting could unseat the first arm side edge 44 from the inner support ledge 58 of the second arm 28. However, any such twisting of the arms 26, 28 is resisted by contact between the first arm slot bottom wall 41 and the second arm recess sidewall 60. Note that clockwise arm twisting is resisted by the right hand hinge 10 while counterclockwise arm twisting is resisted by the left hand hinge 12.

The integrity of the interference fit 98 is further enhanced by seating of the second arm pin 62 in the first arm notch 42. It should be understood that use of the pin 62 is not essential. However, where the hinges 10, 12 are adapted for aircraft use and made of light weight aluminum, for example, the hardened pin 62 inhibits movement and thus wear between these softer interacting surfaces 44, 58.

When use of the work table 18 is no longer required, it may be rotated to a vertical in-storage position as depicted by the broken lines in FIG. 3. To place the work table 18 in this position the table outer part 84 first is raised about 30 degrees so that the second arm-work table pivot connection 88 aligns with the slot 38 of the first arm 26. The table 18 and the second arm 28 then may begin to rotate downward (clockwise as seen in FIG. 3) followed immediately by downward rotation of the first arm 26. The work table 18 then may be lowered to its vertical in-storage position wherein the table 18 and the hinges 10, 12 fit between the side members 14 of the support frame 16 forming a flush exterior.

While an embodiment, uses and advantages of this invention have been shown and described, it should be understood that this invention is limited only by the scope of the claims. Those skilled in the art will appreciate that various changes and modifications may be made without departing from the scope and spirit of the invention, and these changes may result in further uses and advantages.

What is claimed is:

1. A fold-away hinge device for supporting a work surface in a position for use or in an area for storage, said hinge device comprising:

a first arm defined by an elongated segment connecting with an angularly positioned short segment and having an end of said short segment prepared for pivotal attachment to a support, an end of said elongated segment prepared for pivotal attachment to said work surface, and a slot formed in said elongated segment inward from said end, and a second arm defined by an elongated segment connecting with an angularly positioned short segment and having an end of said elongated segment prepared for pivotal attachment to said support at a point spaced from said first arm-support pivot connection, an end of said short segment prepared for pivotal attachment to said work surface at a point spaced from said first arm-work surface pivot connection, and a recess formed as part of said short segment end with said recess including an inner support ledge, wherein said arms may be attached to said support, said work surface may be attached to said arms, said work surface may be placed in position next to said support during periods of non-use, and said work surface may be placed in a position for use by swinging said work surface away from said support with said arms initially rotating in a first direction about said support-arm pivot connections until said second arm-work surface pivot connection aligns with said first arm slot and then rotating in a second opposite direction until said first arm seats on said second arm inner support ledge to maintain said work surface in said in-use position substantially perpendicular to said support.

2. A method of supporting a fold-away work surface in a horizontal in-use position and selectively collapsing said work surface to a vertical in-storage position, said method comprising the steps of:

supporting said work surface in said in-use position by a first and second arm having respective outer ends spaced apart and pivotally attached to an outer and inner part of said work surface with said outer end pivot connections substantially aligned with said work surface and having respective inner ends of said arms spaced apart and pivotally attached to an upper and lower end of a vertical support, and by an interference fit between an inner support ledge of a recess formed as part of said second arm outer end and a side edge of a slot formed adjacent to said first arm outer end, and moving said work surface from said in-use position to said storage area by first raising said work surface and first and second arm to separate said first arm side edge from said second arm inner support ledge and align said first arm slot with said second arm outer end pivot connection and then lowering said work surface and said first and second arms to place said work surface and said arms in said storage area.

3. A collapsible support system for a work surface comprising:

hinge means including a first arm having an elongated segment joined by an angularly offset short segment and a slot formed in said elongated segment inward from an end thereof with said slot defined in part by a bottom wall connecting with spaced apart end walls, and a second arm having a like elongated segment joined by a like angularly offset short segment and a recess formed in said short segment with said recess defined in part by a sidewall connecting with a support ledge positioned inward from an end of said short segment, said second arm short segment of said hinge means located in said hinge means first arm slot with said first arm slot bottom wall engaging said second arm recess sidewall and a side edge of said first arm slot engaging said second arm recess support ledge to horizontally align said first arm elongated segment end and said second arm short segment end and vertically align an end of said first arm short segment and an end of said second arm elongated segment, a support having an upper portion attached to said first arm short segment end of said hinge means by a pivot connection and a lower portion attached to said second arm elongated segment of said hinge means by a pivot connection, and said work surface positioned above said support pivot connections and having an outer part attached to said first arm elongated segment end of said hinge means by a pivot connection and an inner part connected to said second arm short segment end of said hinge means by a pivot connection, wherein said hinge means allows a collapse of said work surface by first swinging said first arm-work surface pivot connection upward to align said second arm-work surface pivot connection with said first arm slot and then swinging said arm-work surface pivot connections downward to position said work surface next to said support.

4. A collapsible support system as defined by claim 3 and further characterized by, said second arm recess support ledge of said hinge means having a hardened pin fitting in a notch in said first arm slot side edge, wherein said movement between said first and second arms of said hinge means is selectively inhibited by interaction of said pin with said notch.

5. A collapsible support system as defined by claim 3 and further characterized by, said hinge means including a right hand hinge and a left hand hinge operatively attached respectively to side edges of said work surface.

6. A collapsible support system as defined by claim 5 and further characterized by, said first arm of said right hand hinge positioned to an outside of said second arm of said right hand hinge, and said first arm of said left hand hinge positioned to an outside of said second-arm of said left hand hinge, wherein twisting of said arms resulting from a load applied to said work surface is resisted in a clockwise direction by said right hand hinge and in a counterclockwise direction by said left hand hinge.

* * * * *